No. 695,282. Patented Mar. 11, 1902.
G. K. CUMMINGS.
MACHINE FOR MAKING PRISMATIC GLASS.
(Application filed May 18, 1898.)
(No Model.) 2 Sheets—Sheet 1.

WITNESSES:
Jas. C. Howell.
Edwin Segur.

INVENTOR
George K. Cummings
BY
Witter & Kenyon
ATTORNEYS

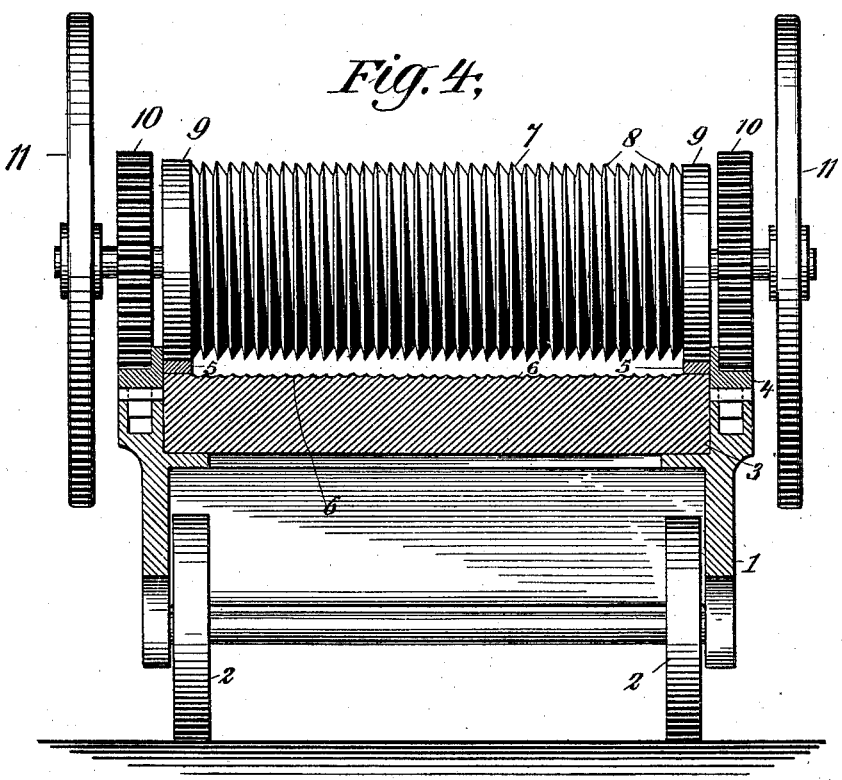
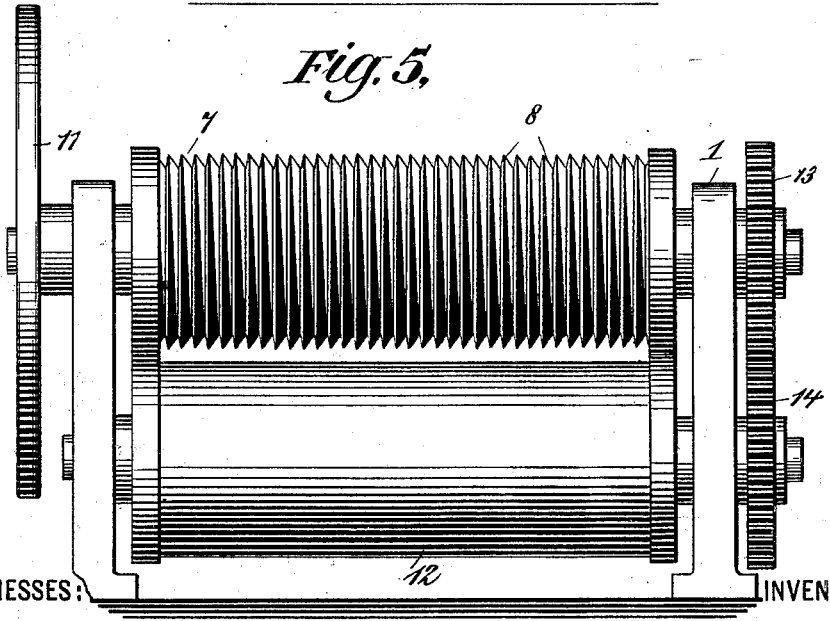

UNITED STATES PATENT OFFICE.

GEORGE K. CUMMINGS, OF NEW YORK, N. Y.

MACHINE FOR MAKING PRISMATIC GLASS.

SPECIFICATION forming part of Letters Patent No. 695,282, dated March 11, 1902.

Application filed May 18, 1898. Serial No. 681,011. (No model.)

*To all whom it may concern:*

Be it known that I, GEORGE K. CUMMINGS, a citizen of the United States, residing in the city of New York, county and State of New York, have invented a new and useful Machine for Making Prismatic Glass, of which the following is a full, clear, and exact specification, reference being had to the accompanying drawings, which form a part hereof.

My invention relates to a machine for rolling sheets of glass provided with ribs of angular or prismatic form from which panes of prismatic glass or what are known as "prism-lights" of any desired shape can be cut; and the object of the invention is to provide a machine by means of which such sheets of prismatic glass can be easily and accurately and economically made, which machine shall be simple in its construction and easy to operate.

Heretofore it has been the general practice to make panes of prismatic glass or prism-lights by a molding process. In this process a mold had to be prepared having the exact form and outline and size of the prism-light to be produced and the glass had to be compressed in this mold by suitable means and then removed therefrom. No other practicable means or device has been known or used in the art for the manufacture of such prism-lights.

My improved machine is provided with a revolving roller, a supporting device to hold the glass against the roller, the said parts having a traversing motion relatively to each other, and one of said parts being provided with parallel ribs of a prismatic form corresponding to the depressions to be made in the glass.

My new machine in its preferred form is fully shown in the accompanying drawings, in which—

Figure 1:
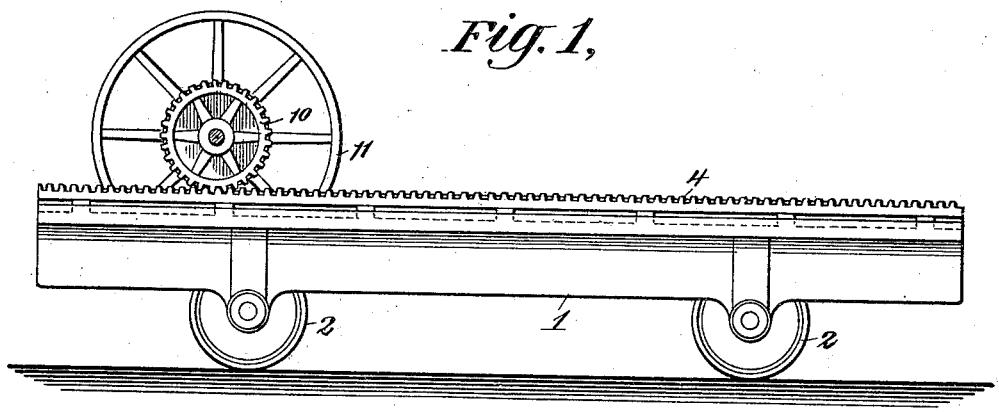
Figure 2:
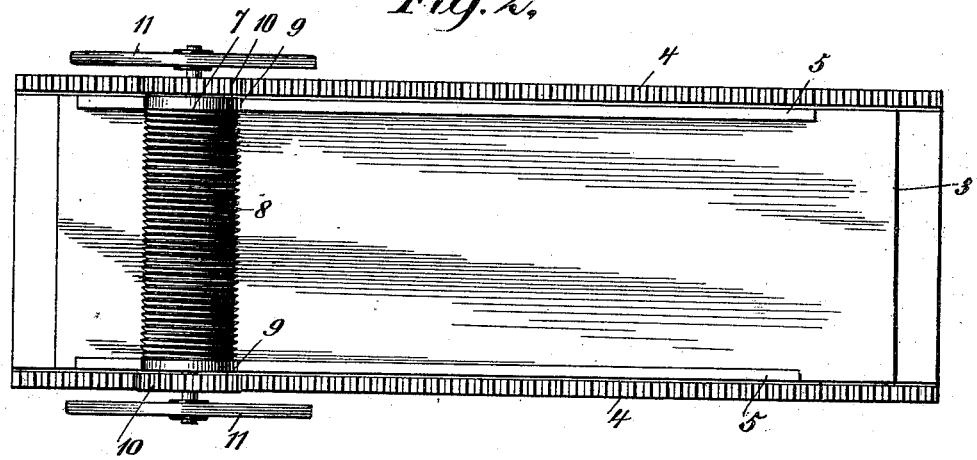
Figure 3:
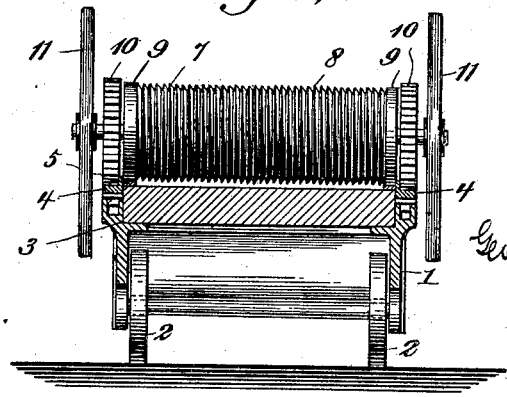

Figure 1 is a side view thereof; Fig. 2, a plan view; Fig. 3, a cross-sectional view. Fig. 4 is a cross-sectional view of both roller and table provided with ribs, and Fig. 5 is an end view of a modification in which the roller is substituted in place of the table.

Similar numbers refer to similar parts in the different figures.

Referring now to the preferred form of my invention shown in the drawings, 1 is a suitable framework which I prefer to mount upon wheels 2, so that the machine can be conveniently moved from place to place. This framework carries the table 3, upon which the molten glass is poured and which serves to support the glass against the roller during the rolling operation. This table is provided with the racks 4 on the sides thereof. The table is also provided with the strips 5 for regulating the thickness of the plate of prismatic glass which is produced by the machine. In the form of machine shown in Figs. 2 and 3 the surface of the table is plain or smooth. In the form shown in Fig. 4 the surface of the table is provided with a series of ribs or projections 6. These ribs are parallel with one another and are parallel with the direction of motion of the roller or the movable part of the machine, whether that be the roller or the table. These ribs are made to correspond in form with the depressions which are to be made on the under side of the plate of glass and are placed directly opposite the prismatic ribs of the roller.

7 is a roller. This roller is provided with the ribs 7. These ribs are continuous—that is to say, they extend entirely around the periphery of the roller. They are annular in shape. They are parallel with one another, and the plane of the ribs 8 is parallel with the direction of motion of the movable part of the machine—that is to say, the direction of motion of the roller or of the table, according to whichever part is made movable—and is perpendicular with the plane of the glass plate. The ribs 8 are made to correspond in form with the angular depressions which it is desired to produce in the plate of glass, and they are preferably made triangular in cross-section and with a cutting edge at their outer angle extending in a direction toward the table 3. The roller is provided with smooth bearing-surfaces 9 at its ends, adapted to rest and ride upon the strips 5.

10 10 are gears which are attached to the ends of the roller 7 and which are adapted to mesh with the racks 4.

11 11 are hand-wheels mounted on the ends of the roller, by means of which the roller is revolved and moved over the table 3.

The operation of the machine is as follows:

The roller and table are first heated by any suitable means, so as to be brought to the proper temperature for operating upon the glass. This can be done by simply pouring a certain amount of molten glass upon the roller and table until they are properly heated. If the roller and table are used in a cold state, they will be found to chill the glass, and thereby to injure the product. The roller having been moved to one end of the table, the molten glass is poured on the table in front of the roller, a sufficient quantity being supplied to the table to make a full sheet of prismatic glass. The surface of the glass which comes into contact with the ladle and also with the air and with the table is chilled to some extent. In order to make the mass of the glass as nearly homogeneous as possible in temperature, the glass is first stirred on the table by any suitable form of stirrer. By means of the hand-wheels 11 the roller is then rolled along the table, so as to roll the glass into the form of a sheet of prismatic glass. As the roller moves over the table and bears down upon the glass a sufficient quantity of the glass passes underneath the roller to fill up all the space between the table and the roller, filling up the triangular grooves or depressions between the ribs on the roller and forming complete and perfect and clean-cut prismatic projections on the upper surface of the glass plate.

As the ribs on the roller are continuous and have cutting edges at their outer angles, the edges of the ribs act as continuous and unbroken knife-edges to cause the upper layer of the glass as it passes under the roller to be divided into separate portions or streams that pass through the separate grooves or channels formed in the surface of the roller by the projecting ribs. There are no square surfaces or shoulders against which the glass strikes or which have to be forced down into the glass, as a result of which the surface of the glass would be broken or torn apart. The glass first encounters the knife-edge of a rib which readily divides the glass mass, causing one part to flow into the channel or groove on one side of the rib and the other part to flow into the channel or groove on the other side of the rib. The sides of the adjoining ribs, forming the walls of a particular groove in the roller, then act as guides to cause the glass to flow into the proper channel and assume the proper form. As the roller revolves the walls of the grooves act to draw the glass through the grooves under the roller and to cause it to fill the grooves thoroughly and form full and perfect prismatic projections or ribs on the surface of the sheet.

As the prismatic ribs on the roller are continuous, the ribs on the finished plate are continuous and uniform.

As the plane of the rib on the roller is perpendicular to the axis of the roller and is parallel with the direction of motion of the roller, the rib passes into and out of the glass with little friction and does not distort the glass or the prismatic ribs formed thereon as the two are separated or break contact.

As the ribs on the roller are parallel, the glass plate is provided with prismatic projections which are not only continuous, but also equal in size and of a regular and uniform size throughout and which have a perfectly sharp true edge free from dents and imperfections, such as are likely to occur in a molding process.

In the form shown in Fig. 4, in which the table is provided with ribs placed directly opposite the ribs of the roller, the glass is forced into the grooves or depressions formed by these ribs, and a plate of glass is thereby formed having projections or prisms on its under surface, also directly opposite the prisms on the upper surface of the plate.

When the glass has been rolled into a plate in the manner described, the plate is transferred to a carrying-wagon or other suitable device and conveyed quickly to the leers, where it is properly annealed.

My invention is attended with many advantageous results. The prismatic glass can be easily, quickly, and economically produced. The prisms are more accurate and perfect than can be produced by a molding process. The sheets of glass can be made of a large size capable of being cut into panes of any desired shape and size or they can be made of any desired size and can be readily cut into any desired shapes.

The machine is simple in construction. The ribbed roller can be made of perfect outline and at small cost by turning it in a lathe. The ribs on the roller are small and have sharp edges. When the glass is a little hard, these edges will sometimes break or chip off. When this happens, the roller can be easily repaired by turning it in a lathe.

The thickness of the glass sheet is determined by the thickness of the strip 5. By putting in a strip of any desired thickness the thickness of the glass can be regulated.

It will be apparent that instead of having the roller travel over the table the table can be made to travel under the roller.

In Fig. 5 I have shown a modification of the machine in which a plain roller 12 is substituted in place of the table 3. The shaft of the ribbed roller is provided at one end with the gear-wheel 13, which meshes with the gear-wheel 14 on the end of the lower plain roller. By this means the lower roller is made to revolve at the same speed with the upper roller and in the proper direction. The glass can be fed to and removed from the rollers by any suitable means.

My invention is not limited to the specific forms of it shown in the drawings herein, as they may be varied in many ways without departing from my invention in its broad features. For example, it is not essential that the ribs which produce the prisms in the glass should be of the same form in cross-section as those shown in the drawings, as long as they are of such a form as to produce suitably-shaped prisms in the glass; nor, for example, is it essential that such ribs be located upon the roller, as they may, if desired, be placed upon the supporting device. This latter species of my invention, which is included within my invention claimed herein, is shown and described and is claimed in its specific form in another application filed by me simultaneously with the filing of this application and known as Serial No. 681,010. Other modifications may also be made in the apparatus shown and described herein.

I do not herein claim the method of making panes or windows of prismatic glass which is partly described in the above specification, as the said method is claimed in other applications filed by me on November 30, 1901—to wit, Serial Nos. 84,207 and 84,208; and I do not herein claim the improved prismatic window which my improved machine is especially adapted to be used in making, as the said product is claimed in separate applications filed by me on August 15, 1898—to wit, Serial Nos. 688,578 and 688,579.

What I claim as new, and desire to secure by Letters Patent, is—

1. In a machine for making plates of prismatic glass, the combination of a revolving roller, a supporting device to hold the glass against the roller, the said parts having a traversing motion relatively to each other, one of said parts being provided with parallel ribs of a prismatic form corresponding to the depressions to be made in the glass.

2. In a machine for making plates of prismatic glass, the combination of a revolving roller, a supporting device to hold the glass against the roller, the said parts having a traversing motion relatively to each other, one of said parts being provided with parallel ribs of a prismatic form corresponding to the depressions to be made in the glass, the said ribs running in a direction parallel to the direction of the traverse movement of the roller and supporting device relatively to each other.

3. In a machine for making plates of prismatic glass, the combination of a revolving roller, a supporting device to hold the glass against the roller, the said parts having a traversing motion relatively to each other, one of said parts being provided with parallel ribs triangular in cross-section.

4. In a machine for making plates of prismatic glass, the combination of a revolving roller provided with parallel ribs of a prismatic form corresponding to the depressions to be made in the glass, a supporting device to hold the glass against the roller, the said parts having a traversing motion relatively to each other.

5. In a machine for making plates of prismatic glass, the combination of a revolving roller provided with continuous annular ribs, angular in cross-section, and a supporting device to hold the glass against the roller, one of the parts being movable relatively to the other.

6. In a machine for making plates of prismatic glass, the combination of a revolving roller provided with continuous parallel annular ribs angular in cross-section, and a supporting device to hold the glass against the roller, one of the parts being movable relatively to the other, and the plane of the ribs on the roller being parallel with the direction of motion of the movable part.

7. In a machine for making plates of prismatic glass, the combination of a revolving roller provided with continuous annular ribs triangular in cross-section and having a cutting edge at their outer angle, and a supporting device to hold the glass against the roller and said cutting edges extending in a direction toward said supporting device, one of the parts being movable upon the other, substantially as set forth.

8. In a machine for making plates of prismatic glass, the combination of a revolving roller provided with continuous parallel annular ribs triangular in cross-section and having a cutting edge at their outer angle, and a supporting device to hold the glass against the roller and said cutting edges extending in a direction toward said supporting device, one of the parts being movable upon the other, the plane of the ribs on the roller being parallel with the direction of motion of the movable part, and perpendicular to the axis of the roller, substantially as set forth.

9. In a machine for making plates of prismatic glass, the combination of a revolving roller provided with continuous parallel annular ribs triangular in cross-section and having a cutting edge at their outer angle, and a supporting-table to hold the glass against the roller said cutting edges extending in a direction toward said supporting-table, the roller being movable on the table, substantially as set forth.

10. In a machine for making plates of prismatic glass, the combination of a revolving roller provided with continuous parallel annular ribs triangular in cross-section and having a cutting edge at their outer angle, and a supporting-table to hold the glass against the roller said cutting edges extending in a direction toward said supporting-table, the roller being movable on the table and the plane of the ribs on the roller being parallel with the direction of motion of the roller, and perpendicular to the axis of the roller, substantially as set forth.

11. In a machine for making plates of prismatic glass, the combination of a revolving roller provided with continuous parallel annular ribs triangular in cross-section and having a cutting edge at their outer angle, and a supporting-table provided with parallel ribs, one of the parts being movable with reference to the other, the plane of the ribs on the roller and the table being parallel with the direction of motion of the movable part, and the plane of the ribs on the roller being perpendicular to the axis of the roller, substantially as set forth.

12. In a machine for making plates of prismatic glass, the combination of a revolving roller provided with continuous parallel annular ribs triangular in cross-section and having a cutting edge at their angle, and a supporting-table provided with parallel ribs, one of the parts being movable with reference to the other, the plane of the ribs on the roller and the table being parallel with the direction of motion of the movable part, the ribs of the table being directly opposite the ribs of the roller, and the plane of the ribs on the roller being perpendicular to the axis of the roller, substantially as set forth.

13. The combination of the roller 7, provided with the ribs 8 triangular in cross-section and having a cutting edge at their outer angle, the gear-wheels 10, the table 3 provided with the ribs 6 directly opposite the ribs 8 of the roller, the racks 4, and the strips 5, substantially as set forth.

In testimony whereof I have signed my name to this specification in the presence of two subscribing witnesses.

GEORGE K. CUMMINGS.

Witnesses:
H. K. CUMMINGS,
JAS. C. HOWELL.